(12) United States Patent
Das

(10) Patent No.: US 10,715,941 B2
(45) Date of Patent: Jul. 14, 2020

(54) MOBILE AND AUTONOMOUS AUDIO SENSING AND ANALYTICS SYSTEM AND METHOD

(71) Applicants: Robert Bosch GmbH, Stuttgart (DE); Samarjit Das, Sewickley, PA (US)

(72) Inventor: Samarjit Das, Sewickley, PA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/344,050

(22) PCT Filed: Oct. 26, 2017

(86) PCT No.: PCT/US2017/058452
§ 371 (c)(1),
(2) Date: Apr. 23, 2019

(87) PCT Pub. No.: WO2018/081368
PCT Pub. Date: May 3, 2018

(65) Prior Publication Data
US 2019/0261109 A1    Aug. 22, 2019

Related U.S. Application Data

(60) Provisional application No. 62/413,163, filed on Oct. 26, 2016.

(51) Int. Cl.
*H04R 29/00*     (2006.01)
*G01N 29/44*     (2006.01)
(Continued)

(52) U.S. Cl.
CPC ....... *H04R 29/008* (2013.01); *G01N 29/4454* (2013.01); *G01N 29/46* (2013.01);
(Continued)

(58) Field of Classification Search
CPC .. H04R 29/008; G01N 29/4454; G01N 29/46; G05D 2201/0216; G05D 1/0274;
(Continued)

(56) References Cited

U.S. PATENT DOCUMENTS

2002/0091491 A1    7/2002  Jackson et al.
2007/0142940 A1*   6/2007  Ferguson ........... G05B 23/0216
                                                  700/83
(Continued)

OTHER PUBLICATIONS

International Search Report and Written Opinion corresponding to PCT Application No. PCT/US2017/058452, dated Feb. 5, 2018 (English language document) (9 pages).

*Primary Examiner* — William A Jerez Lora
(74) *Attorney, Agent, or Firm* — Maginot, Moore & Beck LLP

(57) ABSTRACT

This disclosure relates to a mobile, autonomous audio sensing and analytics system and method for monitoring operating states in one or more environments including manufacturing, commercial, and residential environments. The autonomous audio sensing and analytics system comprises: a plurality of machines configured to listen and collect information; at least one autonomous audio sensing and analytic system configured to capture the listened and collected information; and a visualization system communicatively coupled to at least one or more of machines or the autonomous audio sensing and analytic system, wherein the autonomous audio sensing and analytic system communicatively coupled to more than one machine stores, classifies, estimates, and outputs the information to the visualization system for performing at least one of analysis operation or failure notification.

8 Claims, 3 Drawing Sheets

(51) Int. Cl.
  *G01N 29/46* (2006.01)
  *G05B 19/406* (2006.01)
  *G05D 1/02* (2020.01)
  *G05B 23/02* (2006.01)

(52) U.S. Cl.
  CPC ....... *G05B 19/406* (2013.01); *G05B 23/0216* (2013.01); *G05D 1/0274* (2013.01); *G05B 2219/23181* (2013.01); *G05B 2219/36487* (2013.01); *G05B 2219/37592* (2013.01); *G05D 2201/0216* (2013.01)

(58) Field of Classification Search
  CPC ........... G05B 2219/23181; G05B 2219/36487; G05B 2219/37592; G05B 19/406; G05B 23/0216
  USPC .......................................... 38/56, 58, 86, 91
  See application file for complete search history.

(56) References Cited

U.S. PATENT DOCUMENTS

| | | | |
|---|---|---|---|
| 2013/0173178 A1 | 7/2013 | Poczka et al. | |
| 2013/0268806 A1 | 10/2013 | Park et al. | |
| 2014/0067327 A1* | 3/2014 | Jiang | G05B 23/024 702/185 |
| 2015/0205298 A1 | 7/2015 | Stoschek et al. | |
| 2016/0282872 A1* | 9/2016 | Ahmed | B64C 39/024 |
| 2016/0379113 A1* | 12/2016 | Gruenstein | G06N 3/08 706/20 |
| 2018/0068567 A1* | 3/2018 | Gong | G08G 5/0078 |

\* cited by examiner

MOBILE AND AUTONOMOUS AUDIO SENSING AND ANALYTICS SYSTEM AND METHOD

This application is a 35 U.S.C. § 371 National Stage Application of PCT/US2017/058452, filed on Oct. 26, 2017, which claims the benefit of U.S. Provisional Application No. 62/413,163, filed on Oct. 26, 2016, the disclosures of which are herein incorporated by reference in their entirety.

FIELD

This disclosure relates generally to autonomous systems and, more particularly, to a mobile, autonomous audio sensing and analytics system and method for monitoring operating states in one or more environments including manufacturing, commercial, and residential environments.

BACKGROUND

Unless otherwise indicated herein, the materials described in this section are not prior art to the claims in this application and are not admitted to the prior art by inclusion in this section.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to a mobile, autonomous audio sensing and analytics system and method for monitoring operating states in one or more environments including manufacturing, commercial, and residential environments. This disclosures provides a mobile, autonomous audio sensing and analytic system for monitoring operating states of multiple machines in one or more environments including manufacturing, commercial, and residential environments. The mobile, autonomous audio sensing and analytic system not only monitors the operating states of each machine in the environment in real-time, the system predicts and identifies impending failures useful for efficient maintenance. Furthermore, the system reduces downtime and data-driven process management for smart manufacturing.

In one embodiment of the disclosure, a mobile, autonomous audio sensing and analytic system is provided and includes at least one of a mobile autonomous system having a processor, a memory, at least one inertial sensor, and a communication interface, constructed and configured to communicatively couple to various machines or equipments in an environment.

In another embodiment of the disclosure, a mobile, autonomous audio sensing and analytic system is provided and includes at least of an audio analytic system having a microphone, a processor, a memory, and communication interface, constructed and configured to communicatively couple to the mobile autonomous system, inputs such as machine states captured by the audio analytics module is stored, classified, estimated, and outputted to at least one of a visualization module or a notification system.

In yet another embodiment of the disclosure, a mobile, autonomous audio sensing and analytic system is provided and includes at least of one notification system and an visualization system communicatively coupled to least one of the audio analytic system or a mobile autonomous system; receives processed machine states and broadcasts the processed machine states to authorized users the condition, event, and machine states with an environment.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

Figure 1:
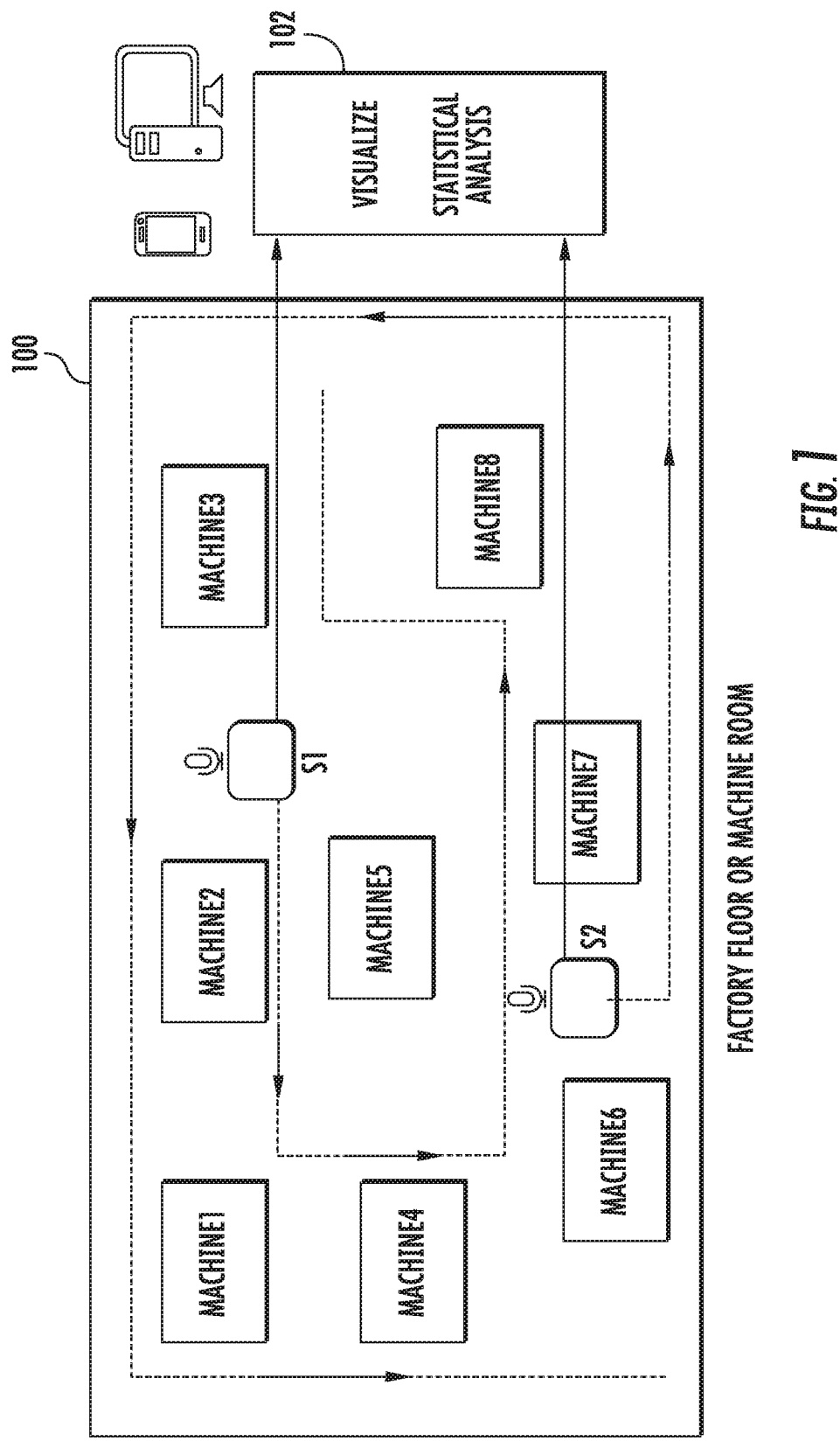
FIG. 1 is a block diagram of a manufacturing floor plan or machine room having a plurality of machines communicatively coupled to a visualization system according to one embodiment of the disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such development effort might be complex and time consuming, but would nevertheless be a routine undertaking of design, fabrication, and manufacture for those of ordinary skill having the benefit of this disclosure.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

This disclosures provides a mobile, autonomous audio sensing and analytic system for monitoring operating states of multiple machines in one or more environments including manufacturing, commercial, and residential environments. The mobile, autonomous audio sensing and analytic system not only monitors the operating states of each machine in the environment in real-time, the system predicts and identifies impending failures useful for efficient maintenance. Furthermore, the system reduces downtime and data-driven process management for smart manufacturing.

In one embodiment of the disclosure, a mobile, autonomous audio sensing and analytic system is provided and includes at least one of a mobile autonomous system having a processor, a memory, at least one inertial sensor, and a communication interface, constructed and configured to communicatively couple to various machines or equipments in an environment.

In another embodiment of the disclosure, a mobile, autonomous audio sensing and analytic system is provided and includes at least of an audio analytic system having a microphone, a processor, a memory, and communication interface, constructed and configured to communicatively couple to the mobile autonomous system, inputs such as machine states captured by the audio analytics module is stored, classified, estimated, and outputted to at least one of a visualization module or a notification system.

In yet another embodiment of the disclosure, a mobile, autonomous audio sensing and analytic system is provided and includes at least of one notification system and an visualization system communicatively coupled to least one of the audio analytic system or a mobile autonomous system; receives processed machine states and broadcasts the processed machine states to authorized users the condition, event, and machine states with an environment.

Now referring to FIG. 1, a block diagram of a manufacturing floor plan or machine room 100 having a plurality of machines M1-M8 communicatively coupled to a visualization system 102 according to one embodiment of the disclosure is illustrated. Although eight machines M1-M8 are illustrated, any number of machines and/or equipments may be provided in the floor plan and connected to the visualization system 102 directly or indirectly. Alternatively, any machines or equipments not necessary in the same floor plan may be connected to the visualization system remotely via a direct or indirect connection. Mobile, autonomous audio sensing and analytic systems, two systems S1 and S2 are illustrated, are communicatively coupled to the visualization system 102. The systems S1 and S2 move around within the floor plan or in an environment where the machines M1-M8 are located either randomly or systematically to listen and collect information including event, condition of machine states, operating states, location of the machine/equipment, environment, or the like. The systems S1, S2, in some embodiments, capture the listened and collected information then either store, classify, estimate, and output the information to the visualization system 102 for either further analysis or failure notification. Although one visualization system 102 and two audio sensing and analytic systems S1, S2 are illustrated, any number of system 102, S1, S2 can be added or removed to the environment. In one embodiment, the systems S1, S2 move around the environment may cover either same or different route/path, randomly or systematically. Each audio sensing and analytic systems S1, S2 comprise a mobile autonomous system 204 and an audio analytic system 206 coupled to the mobile autonomous system 204. The systems S1, S2 are capable to perform one or more tasks in order to facilitate distributed audio sensing and analytics in addition to other tasks such as location estimation, guidance/path planning, obstacle avoidance, motion control, and the like previously described.

Figure 2:
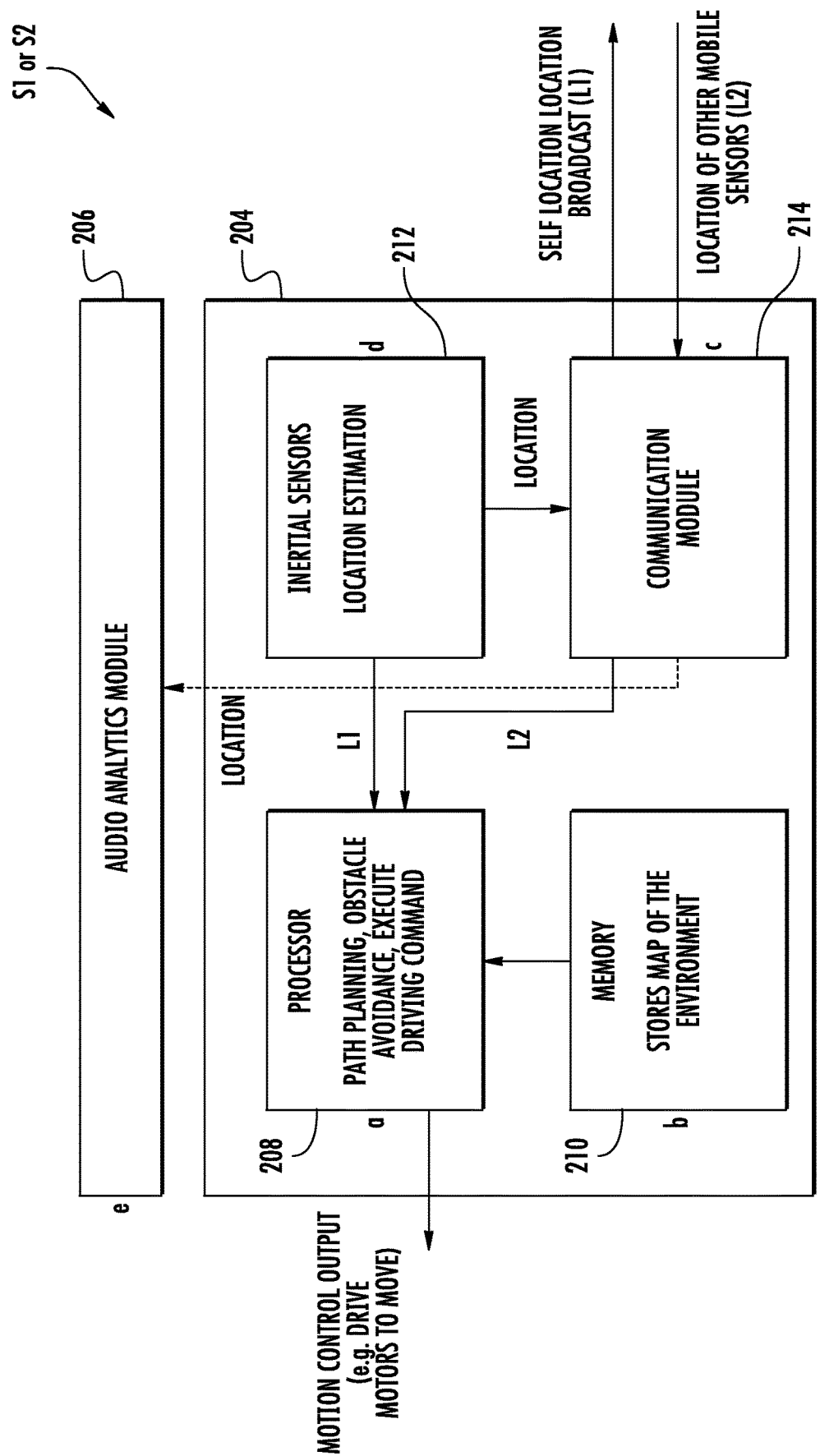
FIG. 2 is a block diagram of a mobile autonomous system according to an exemplary of the disclosure.

FIG. 2 illustrates a block diagram of a mobile autonomous system 204 coupled to an audio analytic system 206 according to an exemplary of the disclosure. The mobile autonomous system 204 constructed and configured to communicatively couple to various machines or equipments in an environment comprises a processor 208, a memory 210, at least one inertial sensor 212, and a communication interface 214. The processor 208 including executable motion/path planning algorithm receives information such as self-location of the mobile autonomous system 204, location of other mobile sensors and the map of the environment, controls a driving system such as a drive motor to move the system S1 or S2 around in the environment without colliding with obstacles such as machines, equipment, other mobile sensor platforms, or any building structures. Motion control signals/commands are transmitted by the processor 208 i.e. to at least one of mechanical system or motors for generating desired motion and/or trajectory. The processor 208 may be of any type, including but not limited to a microprocessor, a microcontroller, a digital signal processor, or any combination thereof. The processor 208 may include one or more levels of caching, such as a level cache memory, one or more processor cores, and registers. Depending on the desired configuration, the processor may be of any type, including but not limited to a microprocessor (μP), a microcontroller (K), a digital signal processor (DSP), or any combination thereof. The processor may include one more levels of caching, such as a level cache memory, one or more processor cores, and registers. The example processor cores may (each) include an arithmetic logic unit (ALU), a floating point unit (FPU), a digital signal processing core (DSP Core), or any combination thereof. An example memory controller may also be used with the processor, or in some implementations the memory controller may be an internal part of the processor.

The memory or computer readable medium 210 saves or stores the map of the environment i.e. the locations of fixed obstacles (e.g. machines for example) and location of paths to move through. The memory or computer readable medium 210 may be of any type including but not limited to volatile memory (such as RAM), non-volatile memory (such as ROM, flash memory, etc.) or any combination thereof. The memory may include an operating system, a communication application, and program data. The communication interface 214 receives location broadcasts from one or more mobile sensors and transmits the received location broadcast to the processor 208 via a link L2. The communication interface 214 optionally also sends out self-location for other mobile sensors to receive via a link L1. In some embodiments, the communication interface 214 may send self-location to the audio analytics system 206 so that the machine states can be fused with the corresponding location for visualization system 102 (as illustrated in FIG. 1). The communication interface 214 allows software and data to be transferred between the computer system and other external electronic devices in the form of signals which may be, for example, electronic, electromagnetic, optical, or other signals capable of being received by the communication interface. The communication interface may be for example a modem, a network interface, a communication port, a PCM-CIA slot and card, or the like. One or more inertial sensors 212 with executable computer source code or program computes the location of the mobile autonomous system in the environment. In some embodiment, the inertial sensors 212 may use other information such as visual odometry, ultra-sound, or radio-frequency based indoor localization provided by a sensing module or suitable sensors either alone or combine with the information collected by the inertial sensors to estimate location state of the mobile autonomous system in the environment.

As depicted in FIG. 2, the communication interface 214 receives location information of any number of mobile sensors in one or more environments and on the received information and a map of one or more environments either stored in the memory within the system 204, on a server, on a network such as a cloud network, or the like. The received information is then transmitted or transferred to the processor 208. The processor 208 receives information such as self-location of the mobile autonomous system 204, location of other mobile sensors and the map of the environment, controls a driving system such as a drive motor to move the system S1 or S2 around in the environment without colliding with obstacles such as machines, equipment, other mobile sensor platforms, or any building structures. Motion control signals/commands are transmitted by the processor 208 i.e. to at least one of mechanical system or motors for generating desired motion and/or trajectory.

Figure 3:
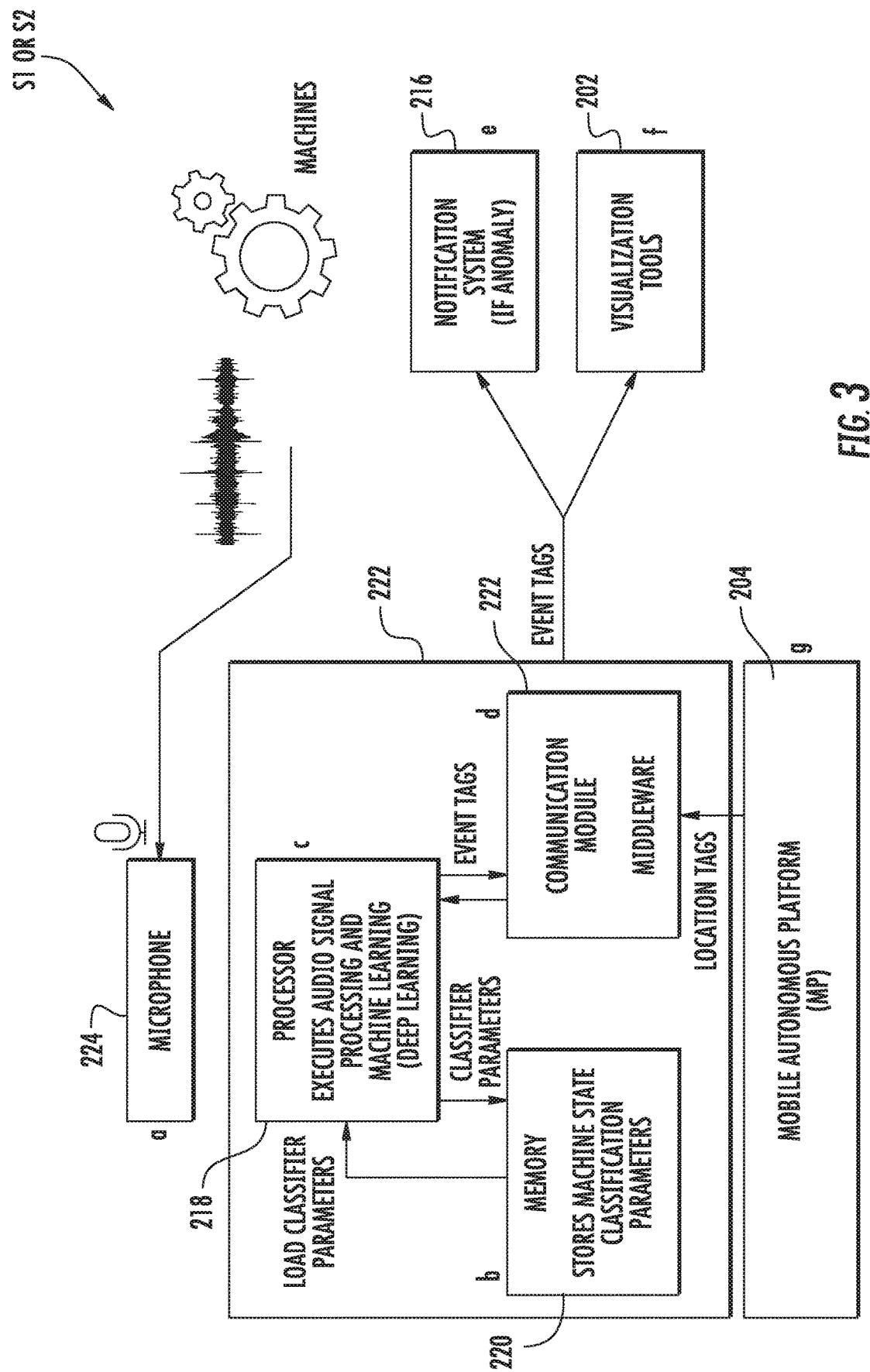
FIG. 3 is a block diagram of an audio analytics system communicatively coupled to the mobile autonomous system of FIG. 2 according to an exemplary of the disclosure.

FIG. 3 illustrates a block diagram of an audio analytics system 206 coupled to a mobile autonomous system 204, a notification system 216, and a visualization system or tools 202 according to an exemplary of the disclosure. Similar to the mobile autonomous system 204, the audio analytics system 206 is also constructed and configured to communicatively couple to various machines or equipments in an environment. The audio analytics system 206 comprises a processor 218, a memory 220, and a communication interface 222. The audio analytics system 206 further comprises at least one sound transducer such as a microphone 224 communicatively coupled to the processor 218. The processor 218 including executable audio analytics algorithm receives information such as classification parameters for audio based machine state estimation from the memory 220 and further receives information such as audio stream real-time from the machines M1-M8 via the microphone 224 before output the received information after processed the inferred machine states/anomalies to the communication interface 222. Upon the receipt of the estimated machine states/anomalies, the communication interface 222 transmits the estimated machine states/anomalies to least one of the visualization system 202 or the notification system 216. Although the audio analytic system 206 and the mobile autonomous system 204 shown as two independent system and each system comprises similar processors 208, 218, memory 210, 220, communication interface 214, 222, and other suitable computer implemented module(s) to perform tasks separately and independently, it is possible that the audio analytic system 206 and the mobile autonomous system 204 integrated in a main system S1 or S2 and therefore the processor, memory, communication interface, and other suitable computer implemented module(s) can perform all the described tasks in the single system S1 or S2.

The processor 218 may be of any type, including but not limited to a microprocessor, a microcontroller, a digital signal processor, or any combination thereof. The processor 218 may include one or more levels of caching, such as a level cache memory, one or more processor cores, and registers. Depending on the desired configuration, the processor may be of any type, including but not limited to a microprocessor (µP), a microcontroller (µC), a digital signal processor (DSP), or any combination thereof. The processor may include one more levels of caching, such as a level cache memory, one or more processor cores, and registers. The example processor cores may (each) include an arithmetic logic unit (ALU), a floating point unit (FPU), a digital signal processing core (DSP Core), or any combination thereof. An example memory controller may also be used with the processor, or in some implementations the memory controller may be an internal part of the processor.

Similar to the memory 210 of the mobile autonomous system 214, the memory or computer readable medium 220 of the audio analytic system 206 also saves or stores the map of the environment i.e. the locations of fixed obstacles (e.g. machines for example) and location of paths to move through. The memory or computer readable medium 220 may be of any type including but not limited to volatile memory (such as RAM), non-volatile memory (such as ROM, flash memory, etc.) or any combination thereof. The memory may include an operating system, a communication application, and program data. The communication interface 222 receives location broadcasts from one or more mobile sensors, fuses the self-location information with estimated machine states from the processor 218, and transmits the self-location information with estimated machine states to the at least one of the visualization system 202, the notification system 216, or a combination thereof. The communication interface 222 may also transmits the self-location information with estimated machine states to a network such as a cloud network, a server, or combination thereof for storage in remote location and for statistical analysis as necessary. The communication interface 222 allows software and data to be transferred between the computer system and other external electronic devices in the form of signals which may be, for example, electronic, electromagnetic, optical, or other signals capable of being received by the communication interface. The communication interface 222 may be for example a modem, a network interface, a communication port, a PCM-CIA slot and card, or the like.

One or more microphones 224 is configured to collect or acquire audio signal from one or more machines M1-M8 in proximity. Other sensing device or module such as accelerometer, vibration sensor may be either incorporated in the audio analytic system 206 or coupled to the microphone 224 to detect any suitable signal from the machines M1-M8 within the environment. Although, the notification system 216 and the visualization system 202 depicted as two separate systems to perform separate tasks, the systems 216, 202 may be integrated into a single device to perform multi-tasks. The notification system 216 is configured to notify appropriate personnel in case the audio analytics algorithms detect anomalous machines states. The visualization system 202 receives the machine state estimate data from the communication interface 222 and renders visualization for factory or facility managers to assess the state of an event such as state of an ongoing manufacturing process, state of the infrastructure, or the like.

The audio analytics algorithms are powered by audio signal processing (for audio feature representation) as well as machine learning capabilities. Audio patterns encode useful information about functional interaction of objects, materials i.e., any physical process; the same thing applies when anomalies occur leading to a "different" physical process which will have its own signature audio pattern. The audio analytics system 206 applies several anomaly detection algorithms with regards to machine health monitoring on the factory floor or machine rooms. These involve collecting audio data during the manufacturing process through the audio sensor mounted on or integrated into the mobile autonomous system 204 (e.g. both when the manufacturing process is going well and when simulated anomalies occur). In one embodiment, unsupervised anomaly detection algorithms or program stored in one of the systems 206, 204 are used to evaluate if anomalous machine operations can be identified with "outlier" audio signature. This algorithm may not involve explicit annotation of the collected audio data into normal operation and various erroneous modes beforehand. In another embodiment, a supervised machine learning algorithms or program, such as, one-class Support Vector Machine (SVM), Gaussian Mixture Models (GMMs) may be used to identify anomalies in the machine operation. In yet another embodiment, deep learning based anomaly detection algorithm or program aids to improve upon the performance of SVM and GMM. The audio analytics system 206 may alternately uses Deep Recurrent Neural Networks (DRNNs) configured to model temporal signal patterns like audio signal. DRNN further models continuous audio patterns without chopping them into segments for performing audio feature computation for anomaly detection. However, feeding machine operation audio stream into a DRNN involves annotation of the collected audio patterns into different operation modes beforehand. With those annotated data, DRNN learns salient audio patterns associated normal machine operation as well as detect when normal manufacturing process deviates into anomalies by identifying the failure modes (e.g. parts straying of straight line or something similar). DRNN is also capable of modeling audio signals associated with human speech suitable for intelligent machine/manufacturing process state monitoring and anomaly detection.

Annotated (faulty vs. normal) machine operations data collected by one or more sensors either mounted to the machines M1-M8 or mounted within the environment is used for training the supervised machine learning algorithms stored in at least one of the systems 204, 206. The sensors capture multimodal sensory data (including audio/vibration) during normal operations of the machine as well as during artificially induced faults transmit the captured data to at least one of the systems 204, 206. In one embodiment, these captured data is annotated appropriately with time stamps and label (anomaly/normal) and fed to a machine learning pipeline. The audio patterns collected from the mobile audio sensor is preprocessed by spectral subtraction method to remove noise from the mobile autonomous itself (e.g. noise from the motors/movement). The spectral subtraction method includes collecting the audio generated purely due to MP movement and generating the corresponding spectrogram. This spectrogram (works as a background model) is subtracted from the audio spectrograms generated from the audio stream from the factory floor. These types of noise removal works similar to background subtraction in computer vision and image processing. In another embodiment, the noise cancellation method based on de-noising auto-encoder may be utilized. For de-noising auto-encoders, the data from the machines collected standalone from the audio sensor is used against the data collected when the sensor is placed on top of the mobile autonomous system. The auto-encoder then is trained to cancel out the noise interferences coming out of mobile autonomous system movements. In yet another embodiment, fusing date may be collected or detected by one or more mobile audio sensors. In one example, fusion/ensemble learning method for fusing data/machine state estimates from multiple mobile audio sensors is adopted. This method ensures optimal usage of information coming out of each sensor for the inference task at hand i.e. machine condition/state and detect anomalies. To further ensure stable performance of the sensor fusion algorithm over time, one or more dynamic Bayesian networks over inferences made at each time step may be used.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system for monitoring operating states of a plurality of machines in an environment, the system comprising:
    at least one autonomous sensing system including (i) at least one processor, (ii) at least one memory configured to store classification parameters of a machine learning model, (iii) an audio sensor configured to record audio data of the plurality of machines in the environment, and (iv) a communication device, the at least one processor being configured to determine a respective operating state of each machine in the plurality of machines based on the recorded audio data of the plurality of machines in the environment, using the machine learning model and the stored classification parameters; and
    a visualization system communicatively coupled to the at least one autonomous sensing system and configured to render a visualization of the operating states of the plurality of machines,
    wherein the at least one processor is configured to operate the communication device to transmit the respective operating state of each machine in the plurality of machines to the visualization system.

2. The system of claim 1, wherein the autonomous sensing system includes a mobile platform having a drive system and the at least one processor is configured to operate the drive system to move the autonomous sensing system through the environment.

3. The system of claim 2, wherein the at least one memory is configured to store a map of the environment that includes locations of fixed obstacles in the environment, and the at least one processor is configured to operate the drive system with reference to the map of the environment to move the at least one autonomous sensing system through the environment without colliding with the fixed obstacles.

4. The system of claim 3, wherein the at least one autonomous sensing system includes a location sensor configured to determine a location of the at least one autonomous sensing system in the environment, and the at least one processor is configured to operate the drive system with reference to the location of the at least one autonomous sensing system in the environment to move the at least one autonomous sensing system through the environment without colliding with the fixed obstacles.

5. The system of claim 3, wherein the locations of fixed obstacles in the environment at least include locations of the plurality of machine within the environment.

6. The system of claim 4 wherein the location sensor includes at least one inertial sensor.

7. The system of claim 1, wherein the at least one processor is configured to detect whether the respective operating state of each machine in the plurality of machines is an anomalous operating state.

8. The system of claim 7 further comprising:
    a notification system configured to notify personnel or a device in response to one of the plurality of machines having an anomalous operating state is detected, wherein the at least one processor is configured to operate the communication device to transmit the respective operating state of a respective machine in the plurality machine to the notification system in response to detecting that the respective operating state of the respective machine is an anomalous operating state.

\* \* \* \* \*